(12) United States Patent
Irie et al.

(10) Patent No.: US 6,332,053 B1
(45) Date of Patent: Dec. 18, 2001

(54) OPTICAL FIBER

(75) Inventors: Yuichiro Irie; Takeo Shimizu; Shoichi Ozawa, all of Tokyo (JP)

(73) Assignee: The Furukawa Electric Co. Ltd., Tokyo (JP)

( * ) Notice: Subject to any disclaimer, the term of this patent is extended or adjusted under 35 U.S.C. 154(b) by 0 days.

(21) Appl. No.: 09/565,064

(22) Filed: May 5, 2000

Related U.S. Application Data

(63) Continuation of application No. PCT/JP99/05256, filed on Sep. 27, 1999.

(30) Foreign Application Priority Data

Sep. 29, 1998 (JP) .................................................. 10-291525

(51) Int. Cl.$^7$ ...................................................... G02B 6/02
(52) U.S. Cl. ................................ 385/123; 385/31; 385/33
(58) Field of Search ..................................... 385/123–128, 385/31–37, 88, 93, 43

(56) References Cited

U.S. PATENT DOCUMENTS

| | | | |
|---|---|---|---|
| 4,490,020 | 12/1984 | Sakaguchi et al. | 350/96.18 |
| 4,795,228 | * 1/1989 | Schneider | 385/43 |
| 5,256,851 | 10/1993 | Presby | 219/121.69 |
| 5,301,252 | 4/1994 | Yanagawa et al. | 385/96 |
| 5,455,879 | * 10/1995 | Modavis et al. | 385/33 |
| 5,845,024 | * 12/1998 | Tsushima et al. | 385/33 |
| 5,933,561 | 8/1999 | Sugizaki | 385/123 |
| 6,094,515 | * 7/2000 | Miki et al. | 385/93 X |

FOREIGN PATENT DOCUMENTS

| | | | |
|---|---|---|---|
| 0 916 976 A1 | 5/1999 | (EP) . | |
| 5-134132 | 5/1993 | (JP) | G02B/6/26 |
| 5-288968 | 11/1993 | (JP) | G02B/6/42 |
| 6-82663 | 3/1994 | (JP) | G02B/6/42 |
| 8-190030 | 7/1996 | (JP) | G02B/6/255 |
| 10-111417 | 10/1996 | (JP) | G02B/6/10 |

OTHER PUBLICATIONS

"Trapezoid Microlenses for Laser Diode to Fiber Coupling" Irie et al: Proceedings of the 1997 Electronics Society Conference of IEICE Sep. 3, 1997.

"Efficient Power Coupling from a 980–nm, Broad–Area Laser to a Single Mode Fiber Using a Wedge–Shaped Fiber Endface" Shah et al. Journal of Lightwave Technology, vol. 8, No. 9, Sep. 1990 pp. 1313–1318.

"Over 200m W 980 nm pump laser diode module using optimized high–coupling lensed fiber" Irie et al. 1999 Optical Fiber Communication Conference pp. 238–240.

International Search Report PCT/JP99/05256 Dec. 14, 1999.

* cited by examiner

Primary Examiner—Phan T. H. Palmer
(74) Attorney, Agent, or Firm—Lacasse & Associates

(57) ABSTRACT

The present invention discloses an optical fiber capable of providing optical connection to a semiconductor laser diode (LD) as a light emitting element at high optical coupling efficiency. An optical fiber (5) for optical coupling efficiency improvement is-coupled, by a fusion joint technique, to an end portion of an optical fiber (2) which is optically connected to a semiconductor LD (3). The optical fiber (5) for optical coupling efficiency improvement has a circular mode field w and the semiconductor LD (3) has an elliptical mode field, wherein the diameter W1 of the fiber (5) is nearly identical to that of the latter field of the semiconductor LD (3) extending in the ellipse's major axis direction. Further, an end portion of the optical fiber 5 for optical coupling efficiency improvement on the side of the semiconductor LD (3) is formed into an approximately wedge-like shape and its endmost portion is formed into a lens.

14 Claims, 4 Drawing Sheets

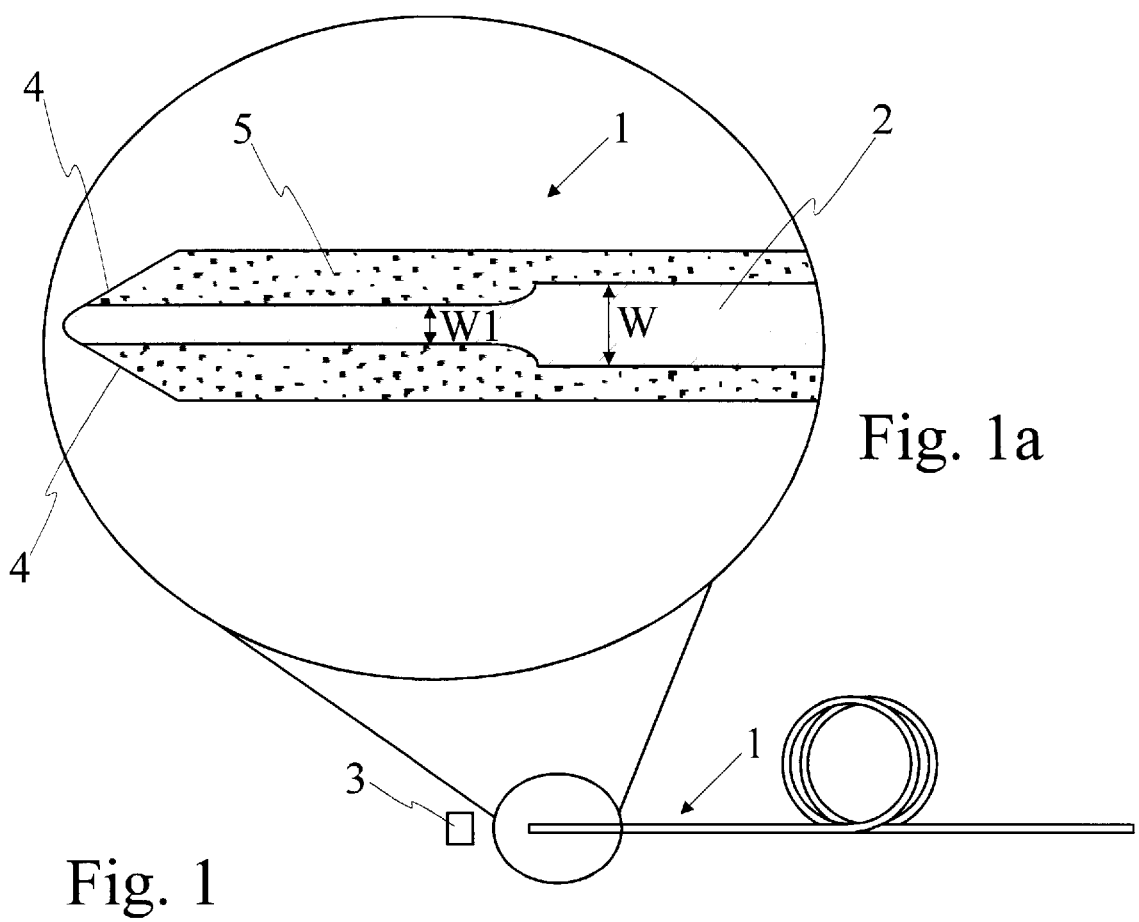
Fig. 1a
Fig. 1
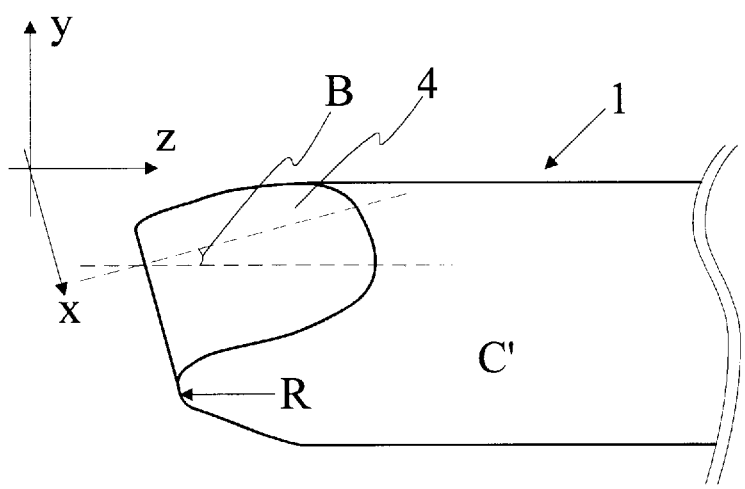
Fig. 2

(a)

(b)

(a)

(b)

(c)

US 6,332,053 B1

OPTICAL FIBER

This Application is a continuation of PCT International Application No. PCT/JP99/05256 filed Sep. 27, 1999.

TECHNICAL FIELD

The prevent invention relates to an optical fiber having a circular shaped mode field suitable for optical connection to a light emitting element, such as a semiconductor laser diode, having an elliptical shaped mode field.

BACKGROUND ART

Referring first to FIG. 7, there is shown a connection end portion of an optical fiber 1 which is optically connected to a light emitting element. FIG. 7(a) is a perspective view of the optical fiber connection end portion. FIG. 7(b) is a cross-sectional view of the optical fiber connection end portion taken on an x-z plane indicated in FIG. 7(a). FIG. 7(c) is another cross-sectional view of the optical fiber connection end portion taken on a y-z plane indicated in FIG. 7(a). The optical fiber 1 has a circular shaped mode field 2. In addition, the optical fiber 1 has a connection end portion improved so as to be optically connected, at high optical coupling efficiency, to the emitting light having an elliptical shaped mode field from a semiconductor laser diode 3 (hereinafter, referred to as the semiconductor LD3). The connection end portion of the optical fiber 1 for optical connection to the semiconductor LD3 is formed into an approximately wedge-like shape and its endmost portion is a curved surface forming a lens. The optical fiber 1 is constructed so that it can collect rays of light emitted from the semiconductor LD3 with the lens.

Various types of optical fibers are available as an optical fiber 1, differing in mode field diameter w from each other. Likewise, there are various types of semiconductor LDs as a semiconductor LD3, differing in mode field diameter from each other. Generally, connection combinations of the type of optical fiber (as the optical fiber 1) connected to the type of semiconductor LD (as the semiconductor LD3) are determined according to specifications.

In the above-described condition in that the combination of the optical fiber 1 and the semiconductor LD3 by type is predetermined, a number of different technique types have been proposed with a view to improving the optical coupling efficiency between the optical fiber 1 and the semiconductor LD3. However, these prior art technologies all fail to provide satisfactory optical coupling efficiency.

For example, a most frequently requested connection combination is a connection combination of the optical fiber having a mode field diameter w of 6 $\mu$m and the semiconductor LD3 having an emitting light wavelength of 980 nm. Although the connection end portion of the optical fiber 1 of FIG. 7 is improved so as to suit the connection combination of this specification, the optical coupling efficiency between the optical fiber 1 and the semiconductor LD3 has not yet reached satisfactory results.

The reason may be considered as follows. The optical coupling efficiency between the optical fiber 1 and the semiconductor LD3 is determined by the product of a optical coupling efficiency component in the direction of x and a optical coupling efficiency component in the direction of y (see FIG. 7(a)). The y-direction optical coupling efficiency component is determined by the curvature radius R of the lens formed at the endmost portion of the optical fiber 1 of FIG. 7(c), and the angle (wedge angle) $\theta$ defined between an inclined plane 4 forming the approximately wedge-shaped end portion of the optical fiber 1 and a core axis C. On the other hand, since optical connection with the semiconductor LD3 is a butt joint due to the x-z cross-section of the end portion of the optical fiber 1 is rectangular as shown in FIG. 7(b), the x-direction optical coupling efficiency is determined by the mode field diameter w of the optical fiber 1 and the type of the semiconductor LD3.

Generally, it is possible to determine the curvature radius R and the wedge angle $\theta$ at suitable values, regardless of the combination specification of the semiconductor LD3 and the optical fiber 1. This makes it easy to improve the y-direction optical coupling efficiency component. On the other hand, the mode field diameter w of the optical fiber 1 and the type of light emitting element are determined by the connection combination specifications, and, as an inevitable consequence, the x-direction optical coupling efficiency is determined by the connection combination specifications. Therefore, it is impossible to improve the x-direction optical coupling efficiency, and there is a limit to improving the total optical coupling efficiency between the optical fiber 1 and the semiconductor LD3. Under the present conditions, there have been no sufficiently satisfactory optical coupling efficiencies achieved.

The results of the examination made by the inventors of the present invention show that, as the circular mode field diameter w of the optical fiber 1 approaches the mode field diameter K1 of the elliptical mode field of the semiconductor LD3 extending in the major axis direction (i.e., in the ellipse's major axis direction), the x-direction optical coupling efficiency increases. However, for the case of the aforesaid combination of the semiconductor LD3 having an emitting light wavelength of 980 nm and the optical fiber 1 having a mode field diameter w of about 6 $\mu$m (which combination is, as described above, a most frequently required combination), the elliptical mode field diameter K1 of the semiconductor LD3 having an emitting light wavelength of 980 nm extending in the ellipse's major axis direction is about 4 $\mu$m, and the mode field diameter w of the optical fiber 1 is at a distance in value away from the mode field diameter K1 of the semiconductor LD3, having a value of about 6 $\mu$m. Because of such a difference in value between K1 and w, the resulting x-direction optical coupling efficiency between the semiconductor LD3 and the optical fiber 1 is not very good. For such reasons, there have been strong demands for further improvement in the optical coupling efficiency between the optical fiber 1 and the semiconductor LD3.

In order to improve the optical coupling efficiency between the optical fiber 1 and the semiconductor LD3, the following may be considered. In addition to forming the y-z cross-section of the optical fiber's endmost portion into an approximately wedge-like shape, it is further arranged such that the optical fiber's endmost portion has an x-z cross-section of an approximately wedge-like shape. However, such arrangement will end up causing the endmost portion of the optical fiber 1 to have a complicated shape, thereby complicating the fabrication process of the optical fiber 1. Further, it is difficult to form the endmost portion of the optical fiber 1 into a desired shape with precision, therefore producing a problem in that the yield of the optical fiber 1 decreases drastically.

Further, if the mode field diameter K1 of the elliptical mode field of the semiconductor LD3 extending in the major axis direction (the ellipse's major axis direction) or the mode field diameter Ks thereof extending in the minor axis direction (the ellipse's minor axis direction) slightly differs, this causes the optical coupling efficiency between the optical fiber 1 and the semiconductor LD3 to vary considerably. This produces the problem of seriously limiting the type of the semiconductor LD3 capable of establishing optical connection at a high optical coupling efficiency.

The present invention was made in order to provide solutions to the above-described problems. Accordingly, a major object of the present invention is to provide an improved optical fiber having a circular mode field capable of optical connection to a light emitting element having an elliptical mode field at a high optical coupling efficiency, regardless of the connection combination specifications of the type of optical fiber and the type of light emitting element.

DISCLOSURE OF INVENTION

In order to achieve the aforesaid object, the present invention has the following characteristic structures. More specifically, the present invention discloses an optical fiber, as a first structure, having a circular mode field which is optically connected to a light emitting element having an elliptical mode field, wherein an optical fiber for optical coupling efficiency improvement having a circular mode field is coupled, by a fusion joint technique, to an end portion of the optical fiber on the side of the optical connection to the light emitting element, with expansion of a core thereof, a lens capable of collecting rays of light emitted from the light emitting element is formed at an end portion of the optical fiber for optical coupling efficiency improvement on the side of the light emitting element, and the circular mode field of the optical fiber for optical coupling efficiency improvement has a mode field diameter nearly identical to that of the elliptical mode field of the light emitting element extending in a major axis direction thereof.

The present invention discloses a second structure according to the above-described first structure, wherein one or more optical fibers for coupling are connected between the optical fiber and the optical fiber for optical coupling efficiency improvement, the coupling optical fiber having a circular mode field diameter different from each of the circular mode field diameter of the other optical fiber.

The present invention discloses a third structure according to the above-described second structure, wherein the optical fiber for coupling has a mode field diameter falling within a range between the mode field diameter of the optical fiber for optical coupling efficiency improvement and the mode field diameter of the optical fiber.

The present invention discloses a fourth structure according to any one of the above-described first, second, and third structures, wherein the optical fiber for optical, coupling efficiency improvement has a mode field diameter of about 4 μm, the end portion of the optical fiber for optical coupling efficiency improvement on the side of the light emitting element is formed into an approximately wedge-like shape, and an endmost portion thereof is formed into a lens having a curvature radius of about 2 μm, and a degree of angle, defined between an inclined plane forming the approximately wedge-shaped end portion of the optical fiber for optical coupling efficiency improvement and the axis of the core, is about 30°.

According to the present invention, the optical fiber for optical coupling efficiency improvement is coupled, by a fusion joint technique, to the end portion of the optical fiber on the side of the optical connection to the light emitting element, the lens is formed at the end portion of the optical fiber for optical coupling efficiency improvement on the side of the light emitting element, and the circular mode field diameter of the optical fiber for optical coupling efficiency improvement is nearly identical to the mode field diameter of the elliptical mode field of the light emitting from the element extending in the ellipse's major axis direction. Such arrangement provides an extremely high optical coupling efficiency between the light emitting from the element and the optical fiber for optical coupling efficiency improvement. Even when the optical fiber has a different mode field diameter defined by specifications, it is possible to easily improve the optical coupling efficiency between the light emitting from the element and the optical fiber by joining the optical fiber for optical coupling efficiency improvement to the end portion of the optical fiber.

Furthermore, since the optical fiber for optical coupling efficiency improvement and the optical fiber are coupled together using a fusion joint technique, the size of a mode field, where the optical fiber and the optical fiber for optical coupling efficiency improvement are joined together, varies in a slight way. Because of such arrangements, the optical coupling loss at the portion where the optical fiber and the optical fiber for optical coupling efficiency improvement are joined together can be decreased to a significant extent. Moreover, because of the use of a fusion joint technique, the joint portion of the optical fiber and the optical fiber for optical coupling efficiency improvement exhibits sufficient strength when bent.

Further, without complicating the shape of the end portion of the optical fiber for optical coupling efficiency improvement, it is possible to achieve a high optical coupling efficiency between the light emitting from the element and the optical fiber for optical coupling efficiency improvement. Therefore, the end portion of the optical fiber for optical coupling efficiency improvement can be processed in an easy manner. Further, since the optical fiber for optical coupling efficiency improvement can easily be joined to the optical fiber by a fusion joint technique, this makes it possible to easily fabricate the optical fiber with the optical fiber for optical coupling efficiency improvement capable of achieving an enhanced optical coupling efficiency.

Further, as described above, the lens is formed at the end portion of the optical fiber for optical coupling efficiency improvement that is connected to the light emitting element, and, in addition, the circular mode field diameter of the optical fiber for optical coupling efficiency improvement is nearly identical to the diameter of the elliptical mode field of the light emitting element extending in the ellipse's major axis direction. This provides a much wider latitude for selecting the type of light emitting element capable of achieving optical connection at a high optical coupling efficiency.

The aforesaid structure, in which the optical fiber for coupling is connected between the optical fiber and the optical fiber for optical coupling efficiency improvement, will make it easy to provide optical fibers which meet needs. Particularly, if the optical fiber for coupling has a mode field diameter falling within the range between the mode field diameter of the optical fiber and the mode field diameter of the optical fiber for optical coupling efficiency improvement, this makes it possible to decrease the optical coupling loss to a further extent in comparison with the case in which the optical fiber for optical coupling efficiency improvement is coupled directly to the optical fiber.

The structure, wherein the optical fiber for optical coupling efficiency improvement has a mode field diameter of about 4 μm, the end portion of the optical fiber for optical coupling efficiency improvement on the side of the light emitting element is formed into an approximately wedge-like shape, and an endmost portion thereof is formed into a lens having a curvature radius of about 2 μm, and a degree of angle, defined between an inclined plane forming the approximately wedge-shaped end portion of the optical fiber for optical coupling efficiency improvement and the axis of the core, is about 30°, enables any optical fiber, whatever mode field diameter it has, to be optically connected, at a high optical coupling efficiency, to a light emitting element having an emitting light wavelength of 980 nm (i.e., a light emitting element of the type which has been used frequently in recent years) by joining the optical fiber for optical coupling efficiency improvement to the end portion.

BRIEF DESCRIPTION OF DRAWINGS

FIG. 1 is a descriptive diagram showing an embodiment of an optical fiber, according to the present invention.

FIG. 1A is an enlarged sectional view of an end of the fiber.

FIG. 2 is a perspective view showing an end portion of the optical fiber shown in FIG. 1 on the side of a light emitting element.

BEST MODE FOR CARRYING OUT THE INVENTION

In order to describe in detail the present invention, reference is now made to the attached drawings for a description of preferred embodiments of the present invention.

FIG. 1 illustrates the entirety of an optical fiber 1, and it further depicts in cross section an end portion of the optical fiber 1 by which the present embodiment is characterized. Referring to FIG. 2, there is shown a perspective view of the characteristic end portion of the optical fiber. Note that the cross section of the end portion of the optical fiber 1 shown in FIG. 1 is a cross section when cutting off the optical fiber 1 on a y-z plane of FIG. 2.

As shown in FIGS. 1 and 2, the present embodiment is characterized in that an end portion of the optical fiber 1 on the side of a semiconductor laser diode LD3 having an elliptical mode field diameter is coupled to an optical fiber 5 for optical coupling efficiency improvement having a circular mode field diameter W1 nearly identical to the mode field diameter K1 of the semiconductor LD3 extending in the ellipse's major axis direction. The optical fiber 2 itself is not an optical fiber of a special type and is a generally-used one whose mode field diameter or the like is predetermined by the specifications.

Figure 3:
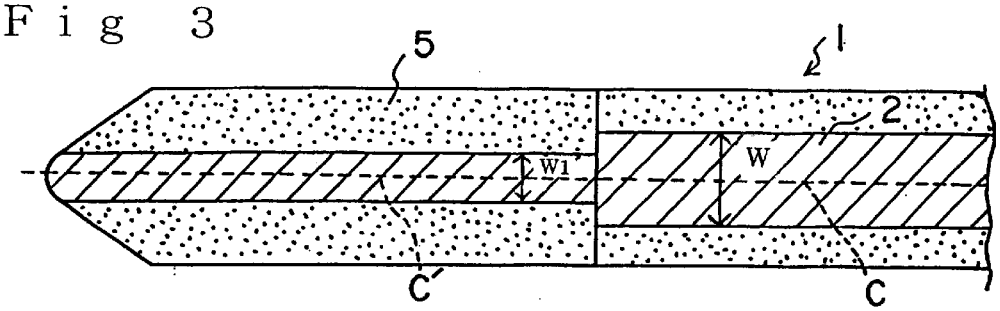
FIG. 3 is a descriptive diagram showing a state prior to joining together the optical fiber and an optical fiber for optical coupling efficiency improvement by a fusion joint technique.

In the present embodiment, the optical fiber 5 for optical coupling efficiency improvement is joined to the optical fiber 2 by a fusion joint technique known in the art as TEC (Thermally-diffused Expanded Core Fusion Joint Technique). In this fusion joint process, with the core axis C of the optical fiber 2 aligned with the core axis C' of the optical fiber 5 for optical coupling efficiency improvement as shown in FIG. 3, the connection portion is heated. By such heating, the optical fiber 2 and the optical fiber 5 for optical coupling efficiency improvement are fused together, and, at the same time, core constituent components of the optical fiber 2 and the optical fiber 5 for optical coupling efficiency improvement are mutually diffused. Because of such mutual diffusion of the core constituent components, there occurs core expansion which causes a mode field, at which the optical fiber 2 and the optical fiber 5 for optical coupling efficiency improvement are coupled together, to vary in size, not in a sudden manner as shown in FIG. 3, but in a gradual manner as shown in FIG. 1. Because of such gradual variations in the size of the mode field, the optical coupling loss at the joint portion of the optical fiber 2 and the optical fiber 5 for optical coupling efficiency improvement can be held low.

Furthermore, in the present embodiment, the end portion of the optical fiber 5 for optical coupling efficiency improvement on the side of the semiconductor LD3 is formed into an approximately wedge-like shape, as shown in FIG. 1, and its endmost portion is lens-processed, in other words, it is formed into a lens. It is arranged such that the wedge angle θ, defined between an inclined plane 4 forming the approximately wedge-shaped end portion of the optical fiber 5 for optical coupling efficiency improvement and the core axis C', and the curvature radius R of the lens formed at the endmost portion of the optical fiber 5 for optical coupling efficiency improvement are set at their respective values capable of maximizing the optical coupling efficiency between the semiconductor LD3 and the optical fiber 5 for optical coupling efficiency improvement. The values of the wedge angle θ and the curvature radius R can be found by arithmetic operations (simulation operations).

Optimal values for the wedge angle θ and the curvature radius R can be derived using various techniques. Here, any one of such techniques can be employed and the description thereof is omitted.

The optical fiber of the present embodiment is constructed in the way as described above and its concrete example is shown below.

As previously pointed out, the combination of the semiconductor LD3 which emits light at a wavelength of 980 nm and the optical fiber 2 having a mode field diameter w of 6 μm is required in many cases. Therefore, a case employing such a typical combination of the semiconductor LD3 and the optical fiber 2 will be described below.

In the semiconductor LD3 having an emitting light wavelength of 980 nm and an elliptical mode field, the mode field diameter K1 of the elliptical mode field extending in the major axis direction (the ellipse's major axis direction) is about 4 μm, and, therefore, the optical fiber 5 for optical coupling efficiency improvement having a mode field diameter W1 of about 4 μm (it is sufficient that the mode field diameter W1 to fall within the range between 3.4 μm and 4.6 μm) is coupled, by a fusion joint technique, to an end portion of the optical fiber 1 on the side of optical connection to the semiconductor LD3. In other words, the optical fiber 5 for optical coupling efficiency improvement, whose circular mode field has a mode field diameter nearly identical to the mode field diameter of the elliptical mode field of the semiconductor LD3 extending in the ellipse's major axis direction, is coupled to the end portion of the optical fiber 2.

Both the wedge angle θ at the approximately wedge-shaped end portion of the optical fiber 5 for optical coupling efficiency improvement, and the curvature radius R of the lens of the endmost portion are set, based on the results of simulation operations, at values capable of maximizing the optical coupling efficiency between the optical fiber 5 for optical coupling efficiency improvement and the light emitting from LD3. In this concrete example, the wedge angle θ is about 30 degrees (it is sufficient that the wedge angle θ falls within the range between 20 degrees and 40 degrees), and the curvature radius R is about 2 μm (it is sufficient that the curvature radius R falls within the range between 1.5 μm and 2.5 μm).

As described above, the end portion is formed into an approximately wedge-like shape so that it has an optimal wedge angle θ and an optimal curvature radius R. In addition, the optical fiber 5 for optical coupling efficiency improvement, whose mode field diameter W1 is nearly identical to the mode field diameter K1 of the elliptical mode field of the semiconductor LD3 extending in the ellipse's major axis direction, is fusion joined to the end portion of the optical fiber 2, whereby the optical coupling efficiency between the semiconductor LD3 and the optical fiber 1 can remarkably be enhanced. Such enhancement in optical coupling efficiency has been confirmed experimentally by the inventors of the present invention.

Figure 4:
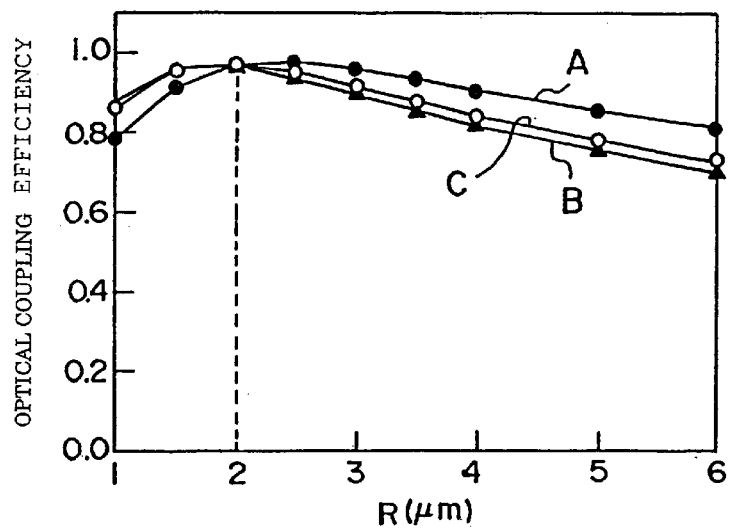
FIG. 4 is a graph showing an example of the variation in the optical coupling efficiency between the optical fiber with the optical fiber for optical coupling efficiency improvement and the light emitting element, with the variation in the curvature radius R of the lens formed at an endmost portion of the optical fiber for optical coupling efficiency improvement.

Referring now to FIG. 4, there is graphed a variation in the optical coupling efficiency between the optical fiber 1 with the optical fiber 5 for optical coupling efficiency improvement and the semiconductor LD3 with respect to the variation in the curvature radius R of the endmost portion of the optical fiber 5 for optical coupling efficiency improvement, for the various semiconductor LD3 types, in the optical fiber 1 with the optical fiber 5 for optical coupling efficiency improvement of FIG. 1 as a characteristic part of the present embodiment. Here, the optical fiber 5 for optical coupling efficiency improvement has a circular mode field diameter W1 of 4 μm and the endmost portion of the optical fiber 5 for optical coupling efficiency improvement has a wedge angle θ of about 30 degrees.

Figure 5:
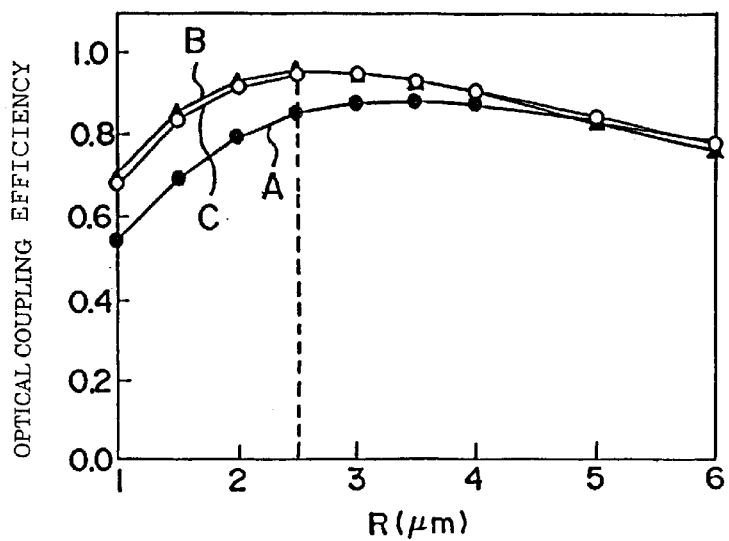
FIG. 5 is a graph showing an example of the variation in the optical coupling efficiency between the light emitting element and the optical fiber without the optical fiber for optical coupling efficiency improvement, with the variation in the curvature radius R of the optical fiber's endmost portion lens.

Referring to FIG. 5, there is shown a comparative example. More specifically, FIG. 5 graphs the variation in the optical coupling efficiency between the optical fiber 1 and the semiconductor LD3 with respect to the variation in the curvature radius R of the lens on the optical fiber endmost portion side for the various semiconductor LD3 types, when the optical fiber 1 of FIG. 7 without the optical fiber for optical coupling efficiency improvement having a mode field diameter w different from the elliptical mode field diameter K1 of the semiconductor LD3 extending in the ellipse's major axis direction, is optically connected to the semiconductor LD3.

In FIGS. 4 and 5, the experimental results obtained when using the semiconductor LD3 of type A is indicated by a solid line curve A, the experimental results obtained when using the semiconductor LD3 of type B is indicated by a solid line curve B, and the experimental results obtained when using the semiconductor LD3 of type C is indicated by a solid line curve C. Here, firstly, the type-A semiconductor LD3 is a semiconductor LD having an elliptical mode field whose diameter Ks extending in the ellipse's minor axis direction is 1.50 μm and whose diameter K1 extending in the ellipse's major axis direction is 3.60 μm. Secondly, the type-B semiconductor LD3 is a semiconductor LD whose mode field diameter Ks extending in the minor axis direction is 1.20 μm and whose mode field diameter K1 extending in the major axis direction is 4.80 μm. Finally, the type-C semiconductor LD3 is a semiconductor LD whose mode field diameter Ks extending in the minor axis direction is 1.28 μm and whose mode field diameter K1 extending in the major axis direction is 4.64 μm.

As can obviously be seen from FIG. 4, in the case of the optical fiber 1 with the optical fiber 5 for optical coupling efficiency improvement of FIG. 1, when the curvature radius R of the endmost portion is about 2 μm, the highest optical coupling efficiency can be obtained with respect to all of the type-A, type-B, and type-C semiconductor LD3s. Moreover, the resulting optical coupling efficiency is about 1.0 (100%). This is a satisfactory result.

On the other hand, in the conventional embodiment shown in FIG. 5, when the curvature radius R of the endmost portion of the optical fiber 1 is about 2.5 μm, the highest optical coupling efficiency can be obtained for each of the type-A, type-B, and type-C semiconductor LD3s, in comparison with any other curvature radii R. However, the highest optical coupling efficiency of FIG. 5 is lower than the highest optical coupling efficiency of FIG. 4 (i.e., the optical coupling efficiency between the optical fiber 1 with the optical fiber 5 for optical coupling efficiency improvement obtained when the curvature radius R is about 2 μm). Besides, FIG. 4 shows that, in the present embodiment, the type-A, type-B, and type-C semiconductor LD3s correspond to each other in their highest optical coupling efficiency without variation, when the curvature radius R is about 2 μm. On the other hand, in the conventional embodiment, when the curvature radius R is about 2.5 μm at which point the highest optical coupling efficiency is obtained, the optical coupling efficiency for the type-A semiconductor LD3 is lower by about 10% than the optical coupling efficiency for the type-B and type-C semiconductor LD3s. This shows that a variation is produced in optical coupling efficiency depending upon the type of the semiconductor LD3.

Figure 7:
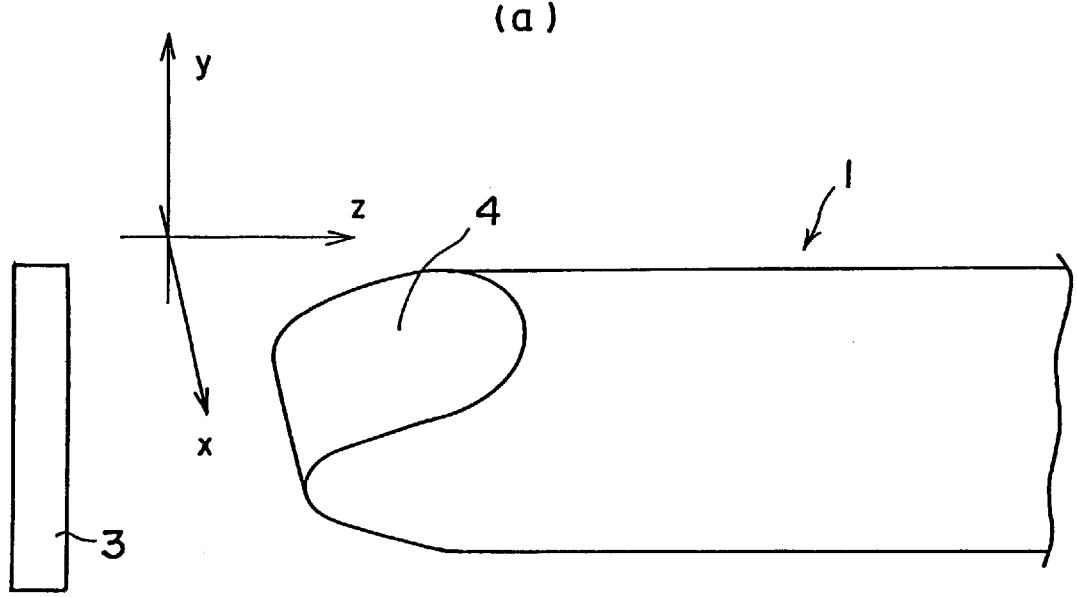
FIGS. 7a–7c are descriptive diagram showing another embodiment of the present invention.
Figure 7:
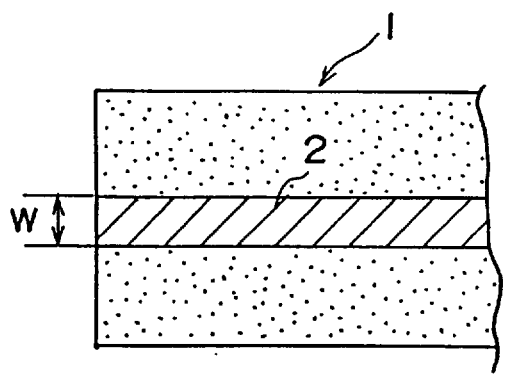
Figure 7:
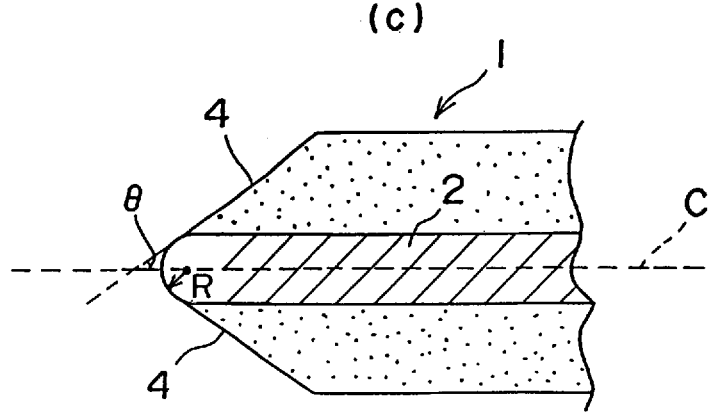

As described above, the optical fiber 1 with the optical fiber 5 for optical coupling efficiency improvement of the present embodiment is able to provide a higher optical coupling efficiency with respect to the semiconductor LD3 in comparison with the conventional optical fiber 1 of FIG. 7. Moreover, the optical fiber 1 of the present embodiment provides a wider latitude for selecting the type of the semiconductor LD3 capable of establishing optical connection at high optical coupling efficiency.

In accordance with the present embodiment, the optical fiber 5 for optical coupling efficiency improvement is joined to the end portion of the optical fiber 2 on the side of the semiconductor LD3, the optical fiber 5 for optical coupling efficiency improvement has a circular mode field diameter W1 nearly identical to the mode field diameter K1 of the semiconductor LD3 extending in the ellipse's major axis direction, and the end portion of the optical fiber 5 for optical coupling efficiency improvement on the side of the semiconductor LD3 is formed into an approximately wedge-like shape and its endmost portion is lens-processed. Such an arrangement provides a considerably high optical coupling efficiency between the semiconductor LD3 and the optical fiber 5 for optical coupling efficiency improvement. Accordingly, it is possible to easily enhance the optical coupling efficiency between the optical fiber 1 and the semiconductor LD3 by joining together the optical fiber 5 for optical coupling efficiency improvement and the end portion of the optical fiber 2 on the side of the semiconductor LD3, regardless of whatever mode field diameter w the optical fiber 2 has, according to the specifications.

Further, the optical fiber 5 for optical coupling efficiency improvement is coupled to the end portion of the optical fiber 2 using a fusion joint technique, as a result of which the mode field will slowly vary in size at the portion where the optical fiber 2 and the optical fiber 5 for optical coupling efficiency improvement are joined together. This makes it possible to decrease, to a significant extent, the optical coupling loss at the joint portion of the optical fiber 2 and the optical fiber 5 for optical coupling efficiency improvement. Furthermore, the optical fiber 2 and the optical fiber 5 for optical coupling efficiency improvement are fusion joined together, so that the joint portion has strength against bending force.

Moreover, the wedge angel θ and the curvature radius R at the endmost portion are determined so as to maximize the optical coupling efficiency between the semiconductor LD3 and the optical fiber, and, then, the approximately wedge-shaped end portion of the optical fiber 5 for optical coupling efficiency improvement is formed. In addition, as described above, the mode field diameter W1 of the optical fiber 5 for optical coupling efficiency improvement is made nearly identical to the mode field diameter K1 of the light emitting from the semiconductor LD3 extending in the ellipse's major axis direction, thereby making it possible to provide a wider latitude for selecting the type of semiconductor LD3 capable of optical coupling at a high optical coupling efficiency.

The allowable range of the mode field diameter W1 of the optical fiber 5 for optical coupling efficiency improvement for achieving high optical coupling efficiencies is wide, ranging from 3.4 μm to 4.6 μm when the optimum mode field diameter W1 is 4 μm. Likewise, the allowable range of the wedge angle θ for achieving high optical coupling efficiencies is wide, ranging from 20 degrees to 40 degrees when the optimum wedge angle θ is 30 degrees. Further, the allowable range of the curvature radius R for achieving high optical coupling efficiencies is wide, ranging from 1.5 μm to 2.5 μm when the optimum curvature radius R is 2 μm. Accordingly, the manufacture yield of the optical fiber 1 with the optical fiber 5 for optical coupling efficiency improvement can be enhanced to a further extent.

Figure 6:
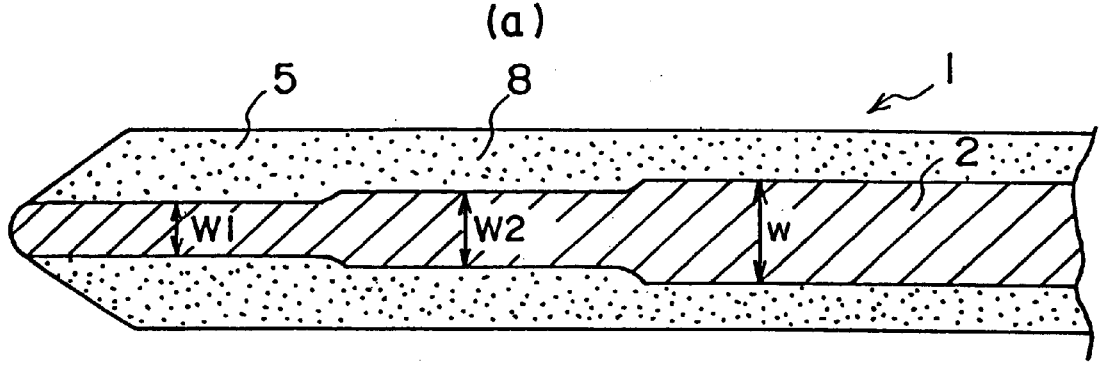
FIGS. 6a–6b are descriptive diagrams showing another embodiment of the present invention.
Figure 6:
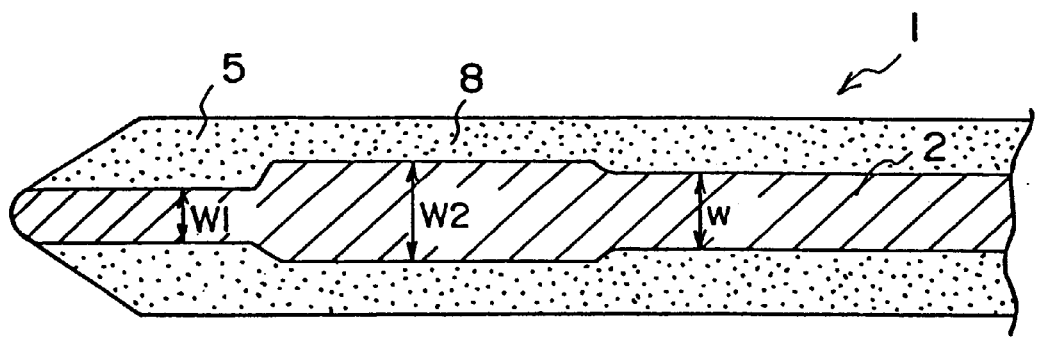

The present invention is not limited to the foregoing embodiment, and, therefore, is embodied in various manners. For example, in the above-described embodiment, the optical fiber 5 for optical coupling efficiency improvement is coupled directly to the optical fiber 1. However, as shown in FIG. 6(a), an arrangement may be made, in which an optical fiber 8 for coupling is connected between the optical fiber 2 and the optical fiber 5 for optical coupling efficiency improvement. In the example of FIG. 6(a), the optical fiber 8 for coupling has a circular mode field and the diameter W2 of the circular mode field of the optical fiber 8 for coupling is greater than any value falling in the range between W1 (the mode field diameter of the optical fiber 5 for optical coupling efficiency improvement) and w (the mode field diameter of the optical fiber 2). In other words, the mode field diameter W2 is greater than the mode field diameter W1 of the optical fiber 5 for optical coupling efficiency improvement, but it is smaller than the mode field diameter w of the optical fiber 2. Also, when the optical fiber 8 for coupling is connected between the optical fiber 2 and the optical fiber 5 for optical coupling efficiency improvement, both the joining of the coupling optical fiber 8 to the optical fiber 2 and the joining of the coupling optical fiber 8 to the optical fiber 5 for optical coupling efficiency improvement are made by fusion. This provides a structure capable of decreasing the optical coupling loss to a significant extent, as described above.

Particularly, in a case where there is a considerable difference between the mode field diameter w of the optical fiber 2 and the mode field diameter K1 of the optical fiber 5 for optical coupling efficiency improvement, the coupling optical fiber 8, whose field diameter W2 falls within the range between the mode field diameter w of the optical fiber 2 and the mode field diameter W1 of the optical fiber 5 for optical coupling efficiency improvement, is connected between the optical fibers 2 and 5, whereby the mode field at the portion where the optical fiber 5 for optical coupling efficiency improvement and the coupling optical fiber 8 are joined together will gradually vary in size. Likewise, the mode field at the portion where the coupling optical fiber 8 and the optical fiber 2 are joined together will gradually vary in size. Accordingly, in comparison with the case where the optical fiber 5 for optical coupling efficiency improvement is coupled directly to the optical fiber 2 and the size of the mode field at the joint portion drastically varies in size, the optical coupling loss can be held lower.

Further, for example, if the use of an optical fiber of a mode field diameter w of 8 μm is required when the optical fiber 2 with the optical fiber 5 for optical coupling efficiency improvement is already available as a product (which is implemented by joining the optical fiber 5 for optical coupling efficiency improvement to the optical fiber 2 having a mode field diameter w of 6 μm), it is possible to easily provide a high optical coupling efficiency optical fiber having a required mode field diameter (i.e., 8 μm) by further connecting an optical fiber having a mode field diameter w of 8 μm to the optical fiber 2 with the optical fiber 5 for optical coupling efficiency improvement. In this case, the optical fiber, the mode field diameter of which is 6 μm, functions as an optical fiber for coupling.

Further, the mode field diameter W2 of the optical fiber 8 for coupling does not necessarily fall within the range between the mode field diameter w of the optical fiber 2 and the mode field diameter W1 of the optical fiber 5 for optical coupling efficiency improvement. For instance, an arrangement may be made, wherein the mode field diameter W2 of the coupling optical fiber 8 is greater or smaller than the mode field diameter w of the optical fiber 2 and the mode field diameter W1 of the optical fiber 5 for optical coupling efficiency improvement (see FIG. 6(b)).

Furthermore, in the above-described embodiment, it is arranged such that the mode field diameter W1 of the optical fiber 5 for optical coupling efficiency improvement is set smaller than the mode field diameter w of the optical fiber 2. However, because of the fact that the mode field diameter W1 of the optical fiber 5 for optical coupling efficiency improvement corresponds to the mode field diameter K1 of the semiconductor LD3 (to which optical connection is made) in the ellipse's major axis direction, it is needless to say that there are cases in which the mode field diameter W1 of the optical fiber 5 for optical coupling efficiency improvement is made greater than the mode field diameter w of the optical fiber 2 depending upon the mode field diameter K1 of the semiconductor LD3 in the ellipse's major axis direction.

Additionally, in the above-described embodiment, it is sufficient for both the optical fiber 5 for optical coupling efficiency improvement and the optical fiber 8 for coupling to have a circular mode field diameter. Therefore, as the optical fibers 5 and 8, commonly-used single mode optical fibers, panda-type optical fibers, or other optical fibers can be employed.

INDUSTRIAL APPLICABILITY

As described above, the present invention provides optical fibers applicable as optical fibers capable of efficient optical connection to light emitting elements such as semiconductor LDs, in the field of optical communication as well as in the field of light signal processing.

What is claimed is:

1. An optical fiber having a circular mode field which is optically connected to a light emitting element for emitting light having an elliptical mode field, the optical fiber comprising:

a first optical fiber portion having a first mode field diameter W1, the first optical fiber portion comprising a first end for receiving the emitted light and a second end for provision of the same, wherein the first end is formed in lens shape for collecting the emitted light; and, a second optical fiber portion in optical communication with and proximate to the second end of the first optical fiber portion, the second optical fiber portion having a mode field diameter W being larger than the first mode field diameter W1.

2. The optical fiber according to claim 1, wherein a third optical fiber portion is connected between said first optical fiber portion and said second optical fiber portion, said third optical fiber portion having a circular mode field diameter different from each of said circular mode field diameter of said first optical fiber portion and said second optical fiber portion.

3. The optical fiber according to claim 2, wherein said third optical fiber portion has a mode field diameter falling within a range between said mode field diameter of said first optical fiber portion for optical coupling efficiency improvement and said mode field diameter of said second optical fiber portion.

4. The optical fiber according to claim 3, wherein said first optical fiber portion has a mode field diameter of about 4 $\mu$m, said end portion of said first optical fiber portion on the side of said light emitting element is formed into an approximately wedge-like shape, and an endmost portion thereof is formed into a lens having a curvature radius of about 2 $\mu$m, and a degree of angle, defined between an inclined plane forming said approximately wedge-shaped end portion of said first optical fiber portion and the axis of said core, is about 30°.

5. The optical fiber according to claim 4, wherein the second end of the first optical fiber portion is connected to the second optical fiber portion using a fusion joint technique.

6. The optical fiber according to claim 2, wherein said first optical fiber portion has a mode field diameter of about 4 $\mu$m, said end portion of said first optical fiber portion on the side of said light emitting element is formed into an approximately wedge-like shape, and an endmost portion thereof is formed into a lens having a curvature radius of about 2 $\mu$m, and a degree of angle, defined between an inclined plane forming said approximately wedge-shaped end portion of said first optical fiber portion and the axis of said core, is about 30°.

7. The optical fiber according to claim 6, wherein the second end of the first optical fiber portion is connected to the second optical fiber portion using a fusion joint technique.

8. The optical fiber according to claim 1, wherein said first optical fiber portion has a mode field diameter of about 4 $\mu$m, said end portion of said first optical fiber portion on the side of said light emitting element is formed into an approximately wedge-like shape, and an endmost portion thereof is formed into a lens having a curvature radius of about 2 $\mu$m, and a degree of angle, defined between an inclined plane forming said approximately wedge-shaped end portion of said first optical fiber portion and the axis of said core, is about 30°.

9. The optical fiber according to claim 8, wherein the second end of the first optical fiber portion is connected to the second optical fiber portion using a fusion joint technique.

10. The optical fiber according to claim 1, wherein the second end of the first optical fiber portion is connected to the second optical fiber portion using a fusion joint technique.

11. A method for efficiently coupling a light beam emitted from a light emitting element having a first mode field diameter into an optical fiber having a second mode field diameter, the second mode field diameter being larger than the first mode field diameter, the method comprising the steps of:

collecting the emitted light using a first end of a first optical fiber portion, the first optical fiber portion having a mode field diameter being approximately equal to the first mode field diameter;

transmitting the collected light through the first optical fiber portion to a second end of the first optical fiber portion, the transmitted light having a mode field diameter being approximately equal to the first mode field diameter; and, providing the collected light to the optical fiber using the second end of the first optical fiber portion, wherein the mode field diameter of the light is expanded to the second mode field diameter during the optical communication between the second end of the first optical fiber portion a receiving end of the optical fiber.

12. A method for efficiently coupling a light beam emitted from a light emitting element having a first mode field diameter into an optical fiber having a second mode field diameter, the second mode field diameter being larger than the first mode field diameter, the method comprising the steps of:

providing an optical fiber element having a mode field diameter being approximately equal to the first mode field diameter, the optical fiber element comprising:

a first port for receiving the emitted light beam, the first port comprising a lens formed at an end portion of the optical fiber element for collecting the emitted light; and, a second port for providing the collected light to the optical fiber; disposing the second port such that the second port is in optical communication with and proximate to the optical fiber; and, disposing the first port such that the lens of the first port is in proximity of the light emitting element for receiving the emitted light.

13. The method according to claim 12, comprising the step of coupling the second port to the optical fiber.

14. The method according to claim 13, wherein the second port is coupled to the optical fiber using a fusion joint technique.

* * * * *